United States Patent
Hansen

(10) Patent No.: US 10,005,889 B2
(45) Date of Patent: Jun. 26, 2018

(54) FISHING ROD WITH ENHANCED TACTILE RESPONSE

(71) Applicant: George Clayton Hansen, Midway, UT (US)

(72) Inventor: George Clayton Hansen, Midway, UT (US)

(73) Assignee: CONDUCTIVE COMPOSITES COMPANY IP, LLC, Heber City, UT (US)

( * ) Notice: Subject to any disclaimer, the term of this patent is extended or adjusted under 35 U.S.C. 154(b) by 449 days.

(21) Appl. No.: 14/730,101

(22) Filed: Jun. 3, 2015

(65) Prior Publication Data

US 2015/0344646 A1 Dec. 3, 2015

Related U.S. Application Data

(60) Provisional application No. 62/007,199, filed on Jun. 3, 2014.

(51) Int. Cl.
| | |
|---|---|
| *A01K 87/00* | (2006.01) |
| *C08J 5/06* | (2006.01) |
| *B29C 70/42* | (2006.01) |
| *C08J 5/04* | (2006.01) |
| *B29C 70/44* | (2006.01) |
| *B29L 23/00* | (2006.01) |
| *B29C 70/88* | (2006.01) |

(52) U.S. Cl.
CPC .............. *C08J 5/06* (2013.01); *A01K 87/00* (2013.01); *B29C 70/42* (2013.01); *B29C 70/446* (2013.01); *C08J 5/042* (2013.01); *B29C 70/882* (2013.01); *B29L 2023/00* (2013.01); *Y10T 428/1355* (2015.01); *Y10T 428/265* (2015.01)

(58) Field of Classification Search
CPC .... A01K 87/00; B29C 70/025; B29C 70/081; B29C 70/32
See application file for complete search history.

(56) References Cited

U.S. PATENT DOCUMENTS

| | | | | |
|---|---|---|---|---|
| 5,654,094 | A * | 8/1997 | Patel | ............ C04B 35/62272 423/291 |
| 2006/0135281 | A1* | 6/2006 | Palumbo | ............... A01K 87/00 473/316 |
| 2007/0281176 | A1* | 12/2007 | Palumbo | ............... A01K 87/00 428/457 |
| 2013/0048903 | A1* | 2/2013 | Garnier | ............... B01J 27/22 252/71 |

(Continued)

*Primary Examiner* — Christopher P Ellis
(74) *Attorney, Agent, or Firm* — Madson IP, P.C.

(57) ABSTRACT

A method and structure for providing improved tactile response in fiber reinforced polymer composite materials is disclosed. The effect is achieved by jacketing the reinforcing carbon fiber with a thin coating of non-carbide forming metal, such as nickel. The resulting chemical and mechanical discontinuity at the fiber/coating interface allows for more transient energy to be retained within the fiber, while the strong chemical bond of the polymer matrix to the metal coating assures mechanical integrity of the composite. The result is a composite which retains its characteristic weight, stiffness, and strength, but exhibits increased low frequency vibrational sensitivity in composite applications, such as for fishing rods and other recreational equipment.

20 Claims, 5 Drawing Sheets

(56) References Cited

U.S. PATENT DOCUMENTS

| | | | | |
|---|---|---|---|---|
| 2014/0091982 A1* | 4/2014 | Hansen | ............ | H01Q 1/36 |
| | | | | 343/897 |
| 2015/0044455 A1* | 2/2015 | Konagai | ............ | B29C 70/12 |
| | | | | 428/338 |
| 2015/0128475 A1* | 5/2015 | Tate | ............ | A01K 87/04 |
| | | | | 43/20 |
| 2015/0181850 A1* | 7/2015 | Noda | ............ | A01K 87/00 |
| | | | | 43/18.5 |
| 2015/0230445 A1* | 8/2015 | Fotland | ............ | A01K 91/02 |
| | | | | 124/60 |
| 2015/0290900 A1* | 10/2015 | Tsunashima | ............ | A63B 49/10 |
| | | | | 473/316 |
| 2016/0002460 A1* | 1/2016 | Nomura | ............ | C08J 5/24 |
| | | | | 524/558 |
| 2017/0182377 A1* | 6/2017 | Simone | ............ | A63B 53/047 |

* cited by examiner

FISHING ROD WITH ENHANCED TACTILE RESPONSE

RELATED APPLICATION

This application claims the benefit of and is a continuation-in-part application of U.S. Provisional Application Ser. No. 62/007,199 entitled "Fishing Rod" that was filed on Jun. 3, 2014 which is incorporated herein by this reference.

BACKGROUND OF THE INVENTION

1. Field of the Invention

The present invention relates to systems and methods for improving performance in shafts that are used in recreational equipment. More specifically, the present invention relates to systems and methods that provide enhanced tactile response in fishing rods.

2. The Relevant Technology

For thousands of years, mankind has used composite rods for dynamic and structural purposes, such as fishing, hiking, and other recreational endeavors, as well as for buildings, bridges, ships masts and such. Of course, the oldest materials were simply natural cellulosic composite, or wood. A few centuries ago, tubes such as fishing rods and barrels were engineered from long, narrow and thin sections of wood. In the case of fishing rods, sections of bamboo, usually split into long, narrow and thin trapezoids and then glued together in a hexagonal fashion were used to create a long, thin, lightweight, flexible, tapered hollow tube.

Such technology sufficed for centuries, until the mid-$20^{th}$ century, when fiberglass reinforced polymer matrix composites were invented. This led to the ability to create laminate sheets of "prepreg", which were then rolled onto a tapered steel mold, or mandrel, along with the appropriate sheet of circumferentially oriented fibers to provide hoop strength to the tube as it oblated during flexure. These rolled sheets were then compressed, cured, and then removed from the mandrel to deliver a highly flexible hollow tapered tube.

In the last third of the $20^{th}$ century, the fiberglass was replaced with carbon fiber, which although being more expensive, was much lighter, stiffer and stronger than fiberglass. Through the last few decades, carbon fibers of increasing modulus and strength have led to fishing rods that are incredibly light, stiff, and strong.

Fishing enthusiasts, some even compete professionally, have become more sophisticated and seek out high performance fishing rods that are more lightweight, stiffer, and stronger. Carbon fiber fishing rods (also frequently called graphite fishing rods) have become the top of the line in high performance fishing rods. However, fishing enthusiasts are consistently searching for the fishing rod that provides enhanced performance without sacrificing weight, stiffness, or strength.

Similarly, recreational enthusiasts are always seeking improvements in the items of equipment they use such as golf club shafts, hiking poles, arrows, ski poles and the like. It will also be appreciated that when using presently available equipment, there is always a desire to have equipment that performs better.

For illustrative purposes, the example of a fishing rod will be used to describe and demonstrate the application of the technology of the present disclosure, although the technology of the present disclosure is not limited to fishing rods, but may be extended to all composite tubular applications that benefit from its objectives, including but not limited to, other items of recreational equipment such as golf club shafts, hiking poles, arrows, ski poles and the like.

The principal quantitative metrics of rod or shaft performance are weight, strength (bending, compressive and hoop), and stiffness (longitudinal and torsional). The literature and patent arts also make a qualitative reference to vibration absorption, and "feel", but do not tie this to any other specific metric or cause.

In recent decades, nickel-coated carbon fibers have been made commercially available. Nickel-coated carbon fibers have been used mainly to increase electrical conductivity of composites; however, nickel-coated carbon fibers have also been used in tubular structures for non-electrical properties.

In one instance, a rod-like product body, mainly including a metallic material, having a metallic plating layer and a resin layer has been disclosed. The metallic plating layer had a metallic luster on its surface and covered an exterior surface of the product body. The resin layer included a thermosetting resin and an adhesive component and was adhered to the surface of the metallic plating layer, permitting the metallic plating layer to be seen through the resin layer.

In another instance, hollow rods were formed with at least one inner ply of graphite fibers in a first thermoset resin matrix and at least one outer ply of nickel-coated graphite fibers in a second thermoset resin. An outermost protective ply was added to protect the integrity of the nickel-coated graphite fibers through finish grinding steps. The nickel-coated graphite fibers were implemented to impart increased impact strength to the final structure and serve to protect the inner graphite fiber layers by preventing crack propagation that would lead to failure of the composite. It was noted that the rods could be formed into suitable shapes for fishing rods, golf shafts, and arrow shafts.

Additionally, a golf club shaft with controllable feel and balance has been disclosed that uses a combination of fiber reinforced plastics and metal-coated fiber-reinforced plastics to obtain optimal characteristics for a particular player. A sheet-rolled or filament wound core was covered by a filament wound outer layer having at least one ply including metal-coated fibers. The fibers could be metal-coated with metals such as: nickel, titanium, platinum, zinc, copper, brass, tungsten, cobalt, gold or silver. The use of metal-coated fibers allowed the use of combinations of fiber reinforced plastic and metal-coated fibers in producing golf club shafts with optimum performance properties. For example, the use of metal-coated fibers allowed the addition of weight to the shaft without significantly influencing its longitudinal or torsional rigidity. Also, specific placement of the metal-coated fibers added weight to predetermined points in the shaft to shift the flex and balance points without varying the shaft's torsional properties and while providing the optimum flex for a given golf club design.

Heretofore, the issue of the quantitative sensitivity of a rod has not been broached in the art. With fishing (or other) rods in general, the issue of sensitivity is only qualitatively discussed; but methods to measure sensitivity, or improve upon sensitivity are only discussed in the industry in relative terms.

Accordingly, a need exists for a new system and method that measurably enhances performance of tubular composites used in recreational equipment. Such a system and methods are disclosed herein.

BRIEF SUMMARY OF THE INVENTION

The exemplary embodiments of the present disclosure have been developed in response to the present state of the art, and in particular, in response to the deficiencies of existing tubular composite structures and needs in the art that have not yet been fully solved by currently available carbon fiber composites.

As a definition for purposes of this disclosure, the term "sensitivity" will be addressed herein as the quantitative response of the handle end of the rod when the tip is subjected to a variety of low frequency vibrations of variable amplitude. The vibrations are generally sub-acoustic, or near sub-acoustic, i.e., below 100 Hz. The vibrations are meant to simulate the action of the rod tip as it experiences different conditions, such as current, bottom or the nibble of a fish. The desired effect is a measurable improvement of the amount of vibrational energy which reaches the handle end of the rod. It should be understood that for rods or shafts used in other items of recreational equipment (such as golf club shafts) that have the energy applied to the handle end, "sensitivity" is the quantitative response of the tip to the application of energy at the handle end.

The exemplary embodiments of this disclosure are directed to a fiber-reinforced polymer composite having an elongate structure such as a tube or rod. The fiber-reinforced polymer composite comprises a plurality of metal-coated carbon fibers within a polymeric resin matrix. Each of the metal-coated carbon fibers comprises a carbon fiber and a metal coating. The metal coating has an interior surface and an exterior surface and is non-carbide forming, meaning that the interior surface of the metal coating will not bond with the carbon fiber, but rather jackets the carbon fiber to insulate the carbon fiber from the polymeric resin used in the polymeric resin matrix. However, the exterior surface of the metal coating does bond with the polymeric resin. Hence, a non-bonding fiber/coating interface (where an outer surface of the carbon fiber abuts with the interior surface of the metal coating) is created between the metal coating and the carbon fiber. This non-bonding fiber/coating interface allows the carbon fiber to move slightly within the coating. This slight movement or slippage enables a conservation of energy as energy travels up or down the elongate structure.

In a normal carbon fiber composite, the carbon fiber is well bound to the epoxy matrix. Thus, when vibrational waves travel either up or down the length of the composite, there is a loss of energy as the vibration moves from the high modulus fiber to the low modulus resin, and back and forth as it continues up or down the length of the elongate structure. However, in the case of the nickel-coated carbon fiber, the interior surface of the nickel coating does not adhere in any fashion to the outer surface of the underlying carbon (nickel is a non-carbide former), but the epoxy adheres extremely well to the oxide rich nickel coating exterior surface. This adhesion lends mechanical integrity of the composite, while at the fiber/coating interface, the lack of a bond conserves the mechanical energy to more fully remain in the core fiber as it travels up or down the composite.

The resulting chemical and mechanical discontinuity at the fiber/coating interface allows for more transient energy to be retained within the carbon fiber (i.e., a conservation of energy), while the strong chemical bond of the polymeric matrix to the metal coating assures mechanical integrity of the composite. The result is a composite which retains its characteristic weight, stiffness, and strength, but exhibits increased low frequency vibrational sensitivity down the elongate structure in composite applications.

Similarly, if energy is applied to the proximal end of the elongate structure (e.g., the handle end of a fishing rod) the same conservation of energy will deliver energy to the distal end (e.g., the tip end of a fishing rod). Using the fishing rod as an example, this sensitivity results in longer casts.

The metal coating may comprise any of a number of metals or metal alloys that are non-carbide forming but will chemically bond with the polymeric matrix. Nickel is particularly suitable because minimal amounts of nickel may be used without sacrificing weight, stiffness or strength and such small amounts of nickel are not cost prohibitive. For instance, the use of carbon fibers with 40% (30% to 50% by weight) nickel on the carbon fiber will result in a composite that is about 20% heavier, but is also considerably stiffer. This added weight is usually unacceptable for items of recreational equipment and the amount of nickel also adds to cost of the composite. But the use of a carbon fiber with minimal nickel (15% to 30% by weight, but nominally around 20%), will result in a rod that is only about 8% to 10% heavier and stiffer. For some recreational uses, this added weight may be acceptable. However, if the pattern of carbon fiber is cut narrower or reduced by the 10%, the resulting composite member when minimal nickel is used will be substantially the same approximate weight, and surprisingly, nearly the same approximate strength and stiffness.

Hence, essentially identical weight, stiffness, and strength exhibited in carbon fiber composites may be achieved in fishing rods or the like fabricated using nickel-coated carbon fibers in the composite. However, the sensitivity (as defined and measured herein) of the counterpart rods is markedly different.

The steps for an exemplary method for fabricating a fiber-reinforced polymer composite tubular structure that exhibits improved sensitivity include coating a reduced amount of carbon fibers with a metal coating on each carbon fiber to form a plurality of metal-coated carbon fibers. The reduced amount of carbon fibers being an amount by weight that offsets the weight of a metal coating to be applied to the carbon fibers so that the fiber-reinforced polymer composite tubular structure being fabricated will have substantially the same weight, stiffness, and strength as the comparable carbon fiber-reinforced polymer composite elongate structure. The metal coating for each carbon fiber of the plurality of carbon fibers comprises non-carbide forming metal so that no chemical occurs between the metal coating and each carbon fiber of the plurality of carbon fibers. This forms a non-bonding fiber/coating interface between the outer surface of each carbon fiber and the interior surface of the metal coating. A polymeric resin may be added to the plurality of metal-coated carbon fibers to form a polymeric resin matrix sheet wherein the metal coating bonds with the polymeric resin. One or more polymeric resin matrix sheets may be rolled onto a mandrel. On one exemplary embodiment, each and every polymeric resin matrix sheet rolled onto a mandrel has a plurality of metal-coated carbon fibers. The polymeric resin matrix sheet(s) that have been rolled onto the mandrel are cured to form the fiber-reinforced polymer composite tubular structure. Once cured the fiber-reinforced polymer composite tubular structure may be removed from the mandrel and delivered for further processing; for example, adding a handle and line hoops in the case of a fishing rod.

These and other features of the present disclosure will become more fully apparent from the following description, or may be learned by the practice of the method disclosed as set forth herein.

BRIEF DESCRIPTION OF THE SEVERAL VIEWS OF THE DRAWINGS

In order that the manner in which the above-recited and other features and advantages of the disclosed exemplary embodiments are obtained will be readily understood, a more particular description of the exemplary embodiments briefly described above will be rendered by reference to specific exemplary embodiments thereof which are illustrated in the appended drawings and graphs. Understanding that these drawings and graphs depict only typical exemplary embodiments and are not therefore to be considered to be limiting of its scope, the exemplary embodiments of the invention will be described and explained with additional specificity and detail through the use of the accompanying drawings graphs in which.

Figure 1:
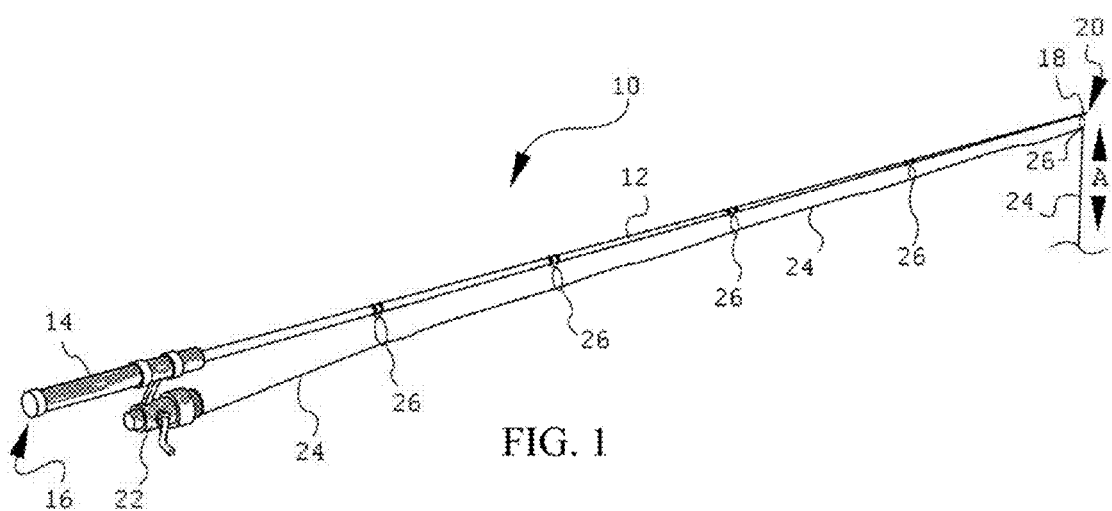
FIG. 1 is a perspective view of an exemplary embodiment of a fishing rod having a tapered tubular structure with metal-coated carbon fibers serving as a portion of the fishing rod.

| REFERENCE NUMBERS | |
|---|---|
| fishing rod 10 | tapered tubular structure 12 |
| handle 14 | proximal end 16 |
| tip 18 | distal end 20 |
| fishing reel 22 | fishing line 24 |
| line hoops 26 | tapered tubular structure blank 28 |
| vibrometer 30 | vibration-imparting device 32 |
| fiber-reinforced polymer composite 34 | hollow interior 36 |
| interior wall 38 | exterior wall 40 |
| wall thickness 42 | metal-coated carbon fiber 44 |
| polymeric resin 46 | overcoating 48 |
| core 50 | outer surface 52 |
| metal coating 54 | interior surface 56 |
| exterior surface 58 | fiber/coating interface 60 |

DETAILED DESCRIPTION OF THE INVENTION

The exemplary embodiments of the present disclosure will be best understood by reference to the drawings graphs, wherein like parts are designated by like numerals throughout. It will be readily understood that the components of the exemplary embodiments, as generally described and illustrated in the figures herein, could be arranged and designed in a wide variety of different configurations. Thus, the following more detailed description of the exemplary embodiments, as represented in the figures, is not intended to limit the scope of the invention, as claimed, but is merely representative of exemplary embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

FIG. 1 is a perspective view of an exemplary embodiment of a fishing rod 10 having a tapered tubular structure 12 with metal-coated carbon fibers serving as a portion of the fishing rod 10. As shown, there is no appreciable difference in the visual appearance of the fishing rod 10 and a carbon fiber fishing rod of substantially identical weight, stiffness, and strength. Fishing rod 10, as shown in FIG. 1, has a tapered tubular structure 12 with a handle 14 attached at the proximal end 16 and a tip 18 disposed at the distal end 20. Fishing rod 10 also has a fishing reel 22 attached to the handle 14 with fishing line 24 threaded through line hoops 26 and extending from the tip 18. Although the fishing line 24 is truncated, in FIG. 1, as it extends downward from the tip 18, a two-way arrow A shows the general direction that a nibble would impart to the fishing line 24 to displace the tip 18 causing a vibrational energy to travel down the tapered tubular structure 12 to handle 14.

As is known with fishing rods, when a force is exerted on the end of the fishing line 24 the tapered tubular structure 12 portion of the fishing rod 10 will bend causing the tapered tubular structure 12 to oblate along its length in response to the force. Also, that force will impart a vibration to the tip 18 of the fishing rod 10 that travels travel down the tapered tubular structure 12 to handle 14. Depending on the feel of a fisherman and the sensitivity of the fishing rod 10, the fisherman may detect vibration in the fishing rod 10 and an experienced fisherman may be able to determine whether the vibration is caused by current, bottom, or the nibble of a fish.

Figure 2:
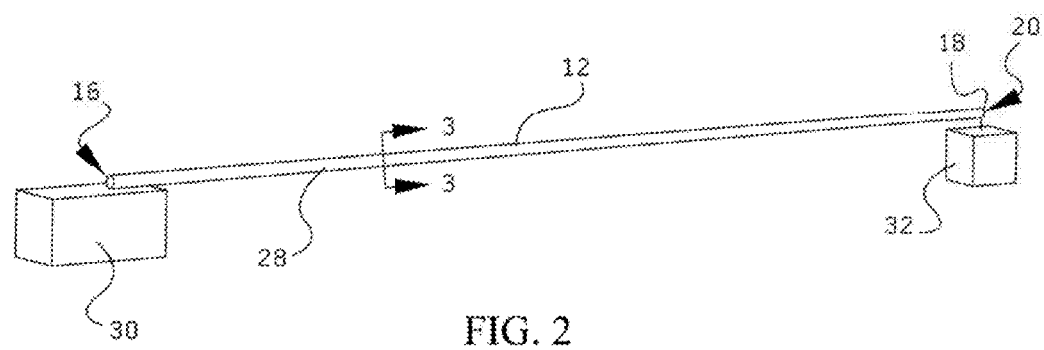
FIG. 2 is a schematic elevation view of a tapered tubular structure with metal-coated carbon fibers such as would be used in the exemplary fishing rod of FIG. 1, set up for sensitivity testing.

To test for sensitivity and to compare the sensitivity between carbon fiber fishing rods and metal-coated carbon fiber fishing rods such as fishing rod 10, a testing protocol was devised and is depicted in FIG. 2. Multiple tapered tubular structure blanks 28 (i.e., tapered tubular structures 12 as would be used in fishing rods 10) made of uncoated carbon fiber and metal-coated carbon fiber, each in a polymeric matrix made of the same polymer, were made to have substantially identical weight, stiffness, and strength. The proximal end 16 was placed on a vibrometer 30 (a type of accelerometer) and the tip 18 at the distal end 20 was connected to vibration-imparting device 32 that imparts vibrations of various frequency and amplitude to the tip 18. The results of various testing will be described in more detail hereafter with reference to FIGS. 5-7.

Figure 3:
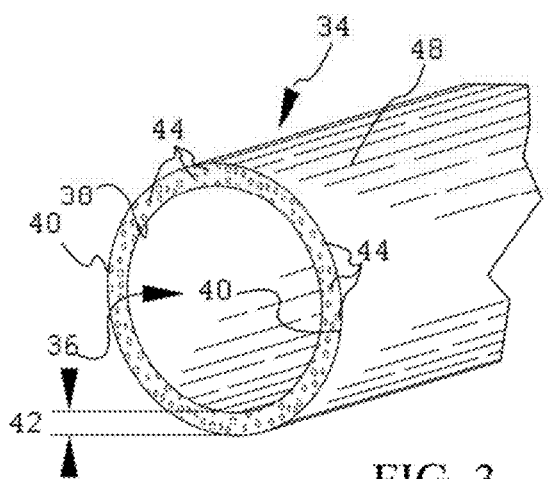
FIG. 3 is a cross-sectional perspective view of the exemplary tapered tubular structure with metal-coated carbon fibers along line 3-3 of FIG. 2.

Turning now to FIG. 3, a cross-section of the tapered tubular structure blank 28 along line 3-3 is shown. The tapered tubular structure blank 28 of FIG. 3 is a fiber-reinforced polymer composite 34 having an elongate structure with a hollow interior 36, an interior wall 38, an exterior wall 40, and a wall thickness 42 of fiber-reinforced polymer composite 34. The fiber-reinforced polymer composite 34 depicted comprises metal-coated carbon fibers 44 within a polymeric resin 46 as is depicted in FIG. 4.

In one exemplary embodiment of the fiber-reinforced polymer composite 34, the metal used in metal coating for the metal-coated carbon fibers 44 is nickel. Nickel is particularly suitable because nickel is non-carbide forming, it bonds well with the polymeric resin 46, and nickel-coated fiber demonstrates s higher modulus of elasticity that is anticipated by the rule of mixtures.

Additionally, nickel-coated fiber causes the fiber-reinforced polymer composite 34 to become metallic and reflective in color. This property enables the fiber-reinforced polymer composite 34 to be overcoated with a tinted clear coat of urethane, epoxy, or other coating. An epoxy overcoating 48 chemically bonds and is quite hard, imparting a very shiny and very durable scratch-resistant coating to the otherwise damage-sensitive composite 34. When properly applied, overcoating 48 is less than three microns thick and adds less than 0.5% weight to the tapered tubular structure blank 28.

Figure 4:
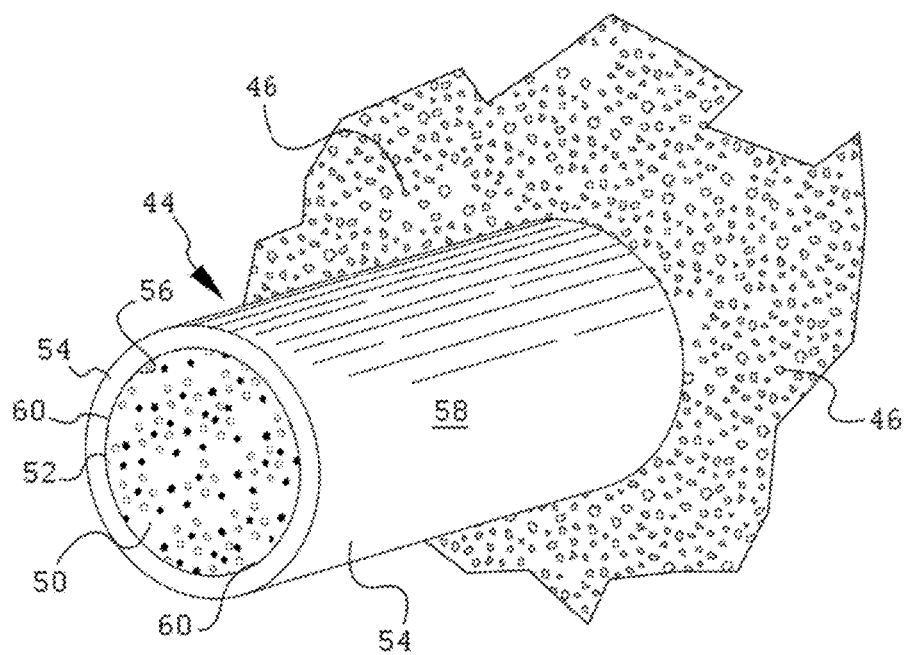
FIG. 4 is a perspective view of an area around a single metal-coated carbon fiber disposed within the polymeric resin, with the polymeric resin stripped away from a portion of the metal-coated carbon fiber to expose the exterior surface of the metal-coated carbon fiber.

FIG. 4 depicts an area around a single metal-coated carbon fiber 44 disposed within the polymeric resin 46 with the polymeric resin 46 stripped away from a portion of the metal-coated carbon fiber 44 to expose the exterior surface of the metal-coated carbon fiber 44. The metal-coated carbon fiber 44 has a core 50 of carbon fiber with an outer surface 52, a metal coating 54 with and interior surface 56 and an exterior surface 58. In FIG. 4, the metal coating 54 comprises nickel and because nickel is non-carbide forming, the interior surface 56 of the nickel will not bond to the outer surface of the carbon fiber core 50 at a fiber/coating interface 60. However, the exterior surface 58 of the nickel bonds with the polymeric resin 46 to give the fiber-reinforced polymer composite 34 mechanical integrity. Because of the non-bonding at the fiber/coating interface 60, the carbon fiber core 50 may move slightly enabling the core 50 to more fully retain vibrational energy imparted to the composite 34. As the vibrational energy travels down the tapered tubular structure blank 28, less vibrational energy is lost by passing back and forth from the high modulus carbon fiber core 50 to the low modulus polymeric resin 46.

Now referring generally to FIGS. 1-4 wherein the tapered tubular structure blank 28 of FIG. 2 is a tapered tubular structure 12 of FIG. 1, the substructures depicted in FIGS. 3 and 4 are representative of the tapered tubular structure 12 of FIG. 1. With respect to the tips 18 of the various tapered tubular structure blanks 28, whether made of plain carbon fiber or metal-coated carbon fiber 44, the tapered tubular structure blanks 28 of substantially identical weight, stiffness, and strength can be fabricated, if fibers with minimal amount of nickel coating are used. For instance, the use of carbon fibers with about 40% (30% to 50% by weight) nickel on the carbon fiber will result in a composite that is about 20% heavier, but is also considerably stiffer. By using carbon fiber with a minimal nickel coating (15% to 30%, but nominally around 20%), a tapered tubular structure blank 28 that is about 8% to 10% heavier and stiffer. However, if the pattern of carbon fiber is cut narrower by the 10% (i.e., about 10% less carbon fiber is used), the resulting composite will be substantially the same approximate weight, and surprisingly, nearly the same approximate strength and stiffness. In mechanical testing, though counter-intuitive, the nature of the carbon/nickel/epoxy resin interfaces as compared to the plain carbon/epoxy resin interface it has been shown that there is an enhancing of the mechanical properties over the plain carbon composite.

The work to establish measurable improvement initiated when the applicant fabricated a few nickel-coated carbon fiber fishing rods 10 for recreational "show and tell" purposes under confidentiality arrangements. Those who fished with these rods 10 reported that they could feel the vibration of a fish nibbling sooner and lighter than they could with a normal graphite rod.

Hence, applicant set out to demonstrate that a fishing rod 10 (or other applicable structure), having essentially identical characteristics of weight, stiffness, and strength to the plain carbon fiber counterpart, may be fabricated with nickel-coated carbon fibers. Furthermore, it has been demonstrated that the low frequency vibrational response can be quantitatively measured, and using rods having essentially identical characteristics of weight, stiffness, and strength, the rod 10 fabricated with the nickel-coated carbon fibers significantly and statistically demonstrated enhanced tactile response. As demonstrated, the amount of vibrational energy detected at the handle 14 end of a plain graphite rod, when the tip 18 is identically vibrated, is increased by about 50% in the nickel-coated carbon fiber rods 10. In other words, the nickel-coated fiber rods 10 conserved about 50% more vibrational energy down the rod 10 than the plain graphite rod.

This quantitative measurement of vibrational conservation was conducted by a number of methods, being:
1. ASTM E756, Standard Test Method for Measuring Vibration-Damping Properties of Materials, where in the zeta factor, or amount of energy reaching (or not lost) to the other end of a length is measured and compared on a frequency domain basis.
2. A method by which a frequency domain vibration is induced into the tip of a rod blank, and the amplitude of the vibration resulting at the other end is measured.
3. A method by which a single frequency vibration is induced into the tip and the amplitude of the vibration resulting at the other end is measured.

Further, human subject studies were also conducted to test the results of enhanced sensitivity against human trials that will be discussed in greater detail below.

Figure 5:
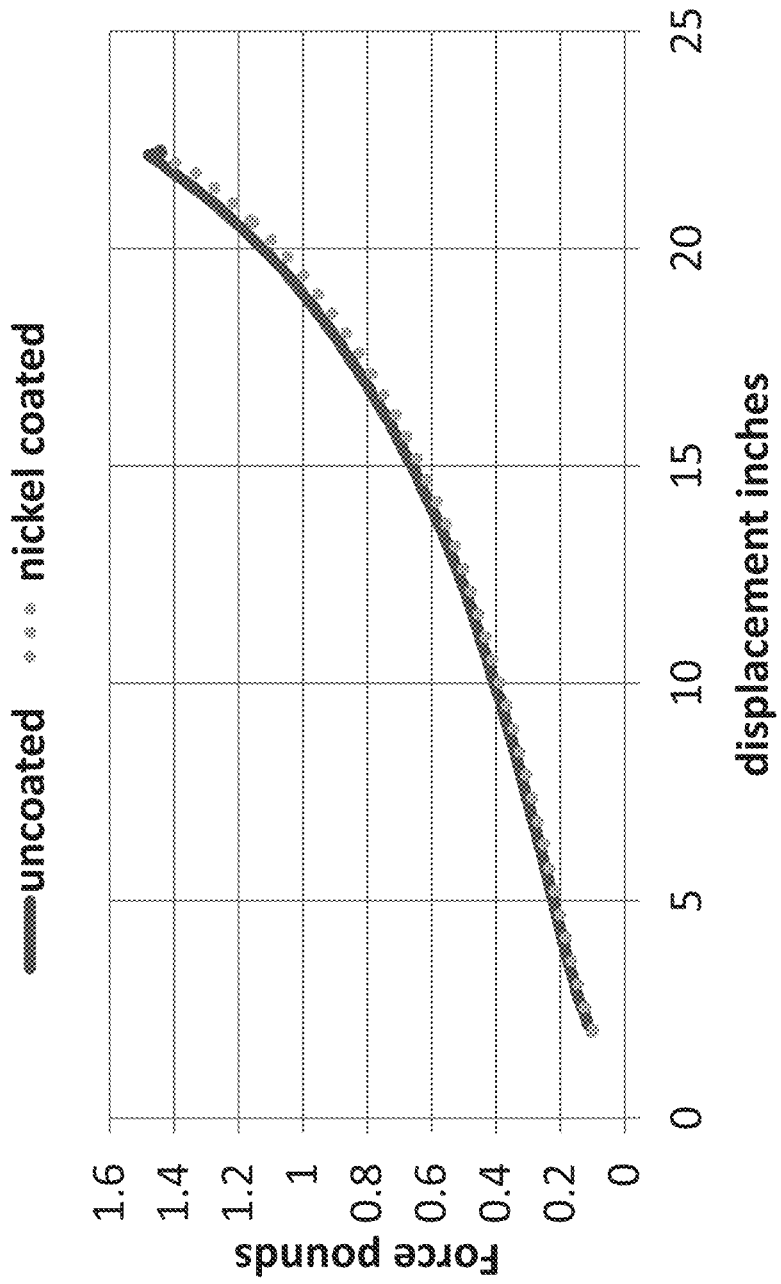
FIG. 5 is a graph entitled "Graph 1-Force vs. Displacement for rod tips comparing nickel coated vs. uncoated carbon fiber for tips of approximate equal weight" showing the relative similarity in the compared rods.

Two sets of tapered tubular structure blanks 28 rod tips were fabricated, one from nickel-coated carbon fiber (an exemplary embodiment of metal-coated carbon fiber 44) and one from uncoated carbon fiber. Identical base carbon fibers and polymeric resin 46 were used. The nickel-coated fiber count was reduced to offset the increased nickel weight. The weights of each population were measured. These two populations were subjected to a tip 18 bend test in an Instron tensile tester (a type of vibration-imparting device 32), as shown in FIG. 2. The force verses displacement was plotted in Graph 1, as shown in FIG. 5. With respect to the populations of tapered tubular structure blanks 28 by weight, force and displacement were found to be within 6% of each other, which for sensitivity purposes are essentially identical. Due to the complex nature of bending a tube of continually variable diameter and wall thickness, no attempt was made to convert the force and displacement to stress, strain and modulus.

ASTM E 756 Standard Test Method for Measuring Vibration-Damping Properties of Materials. For this test, flat bars 12" long×1" wide×0.030" thick were fabricated using the same weight of fibers for each. The bars were then subjected to frequency domain vibrational analysis, per ASTM E756, Standard Test Method for Measuring Vibration-Damping Properties of Materials. In this test, one end of the bar is vibrated, where in the zeta factor, or amount of energy reaching (or not lost) to the other end of a length is measured and compared on a frequency domain basis. The larger the zeta factor, the greater the energy loss. The lower he zeta number, the more energy is conserved down the length of the bar.

The zeta factor for the uncoated carbon fiber composite was 0.0052, and the zeta factor for the nickel-coated carbon fiber composite was 0.0029. In simple terms, this may be interpreted that while the carbon fiber composite lost 0.5% of its energy, the nickel-coated carbon fiber bars lost only 0.29% of its energy.

Frequency Sweep testing. A test was devised wherein the tip 18 of each blank 28 was placed into a close fitting slot in a vibrating bar. The proximal end 16 of the blank 28 was then placed securely in a V block and secured with a 50 gram weight. An accelerometer (vibrometer 30) was placed in on the blank 28 about 1" from the proximal end 16. The tip 18 was then subjected to a swept frequency at a constant low power to the vibrating tip 18. Six samples from the uncoated population and six from the metal-coated population were tested. The test was then repeated, but at a constant high power to the tip 18.

Figure 6:
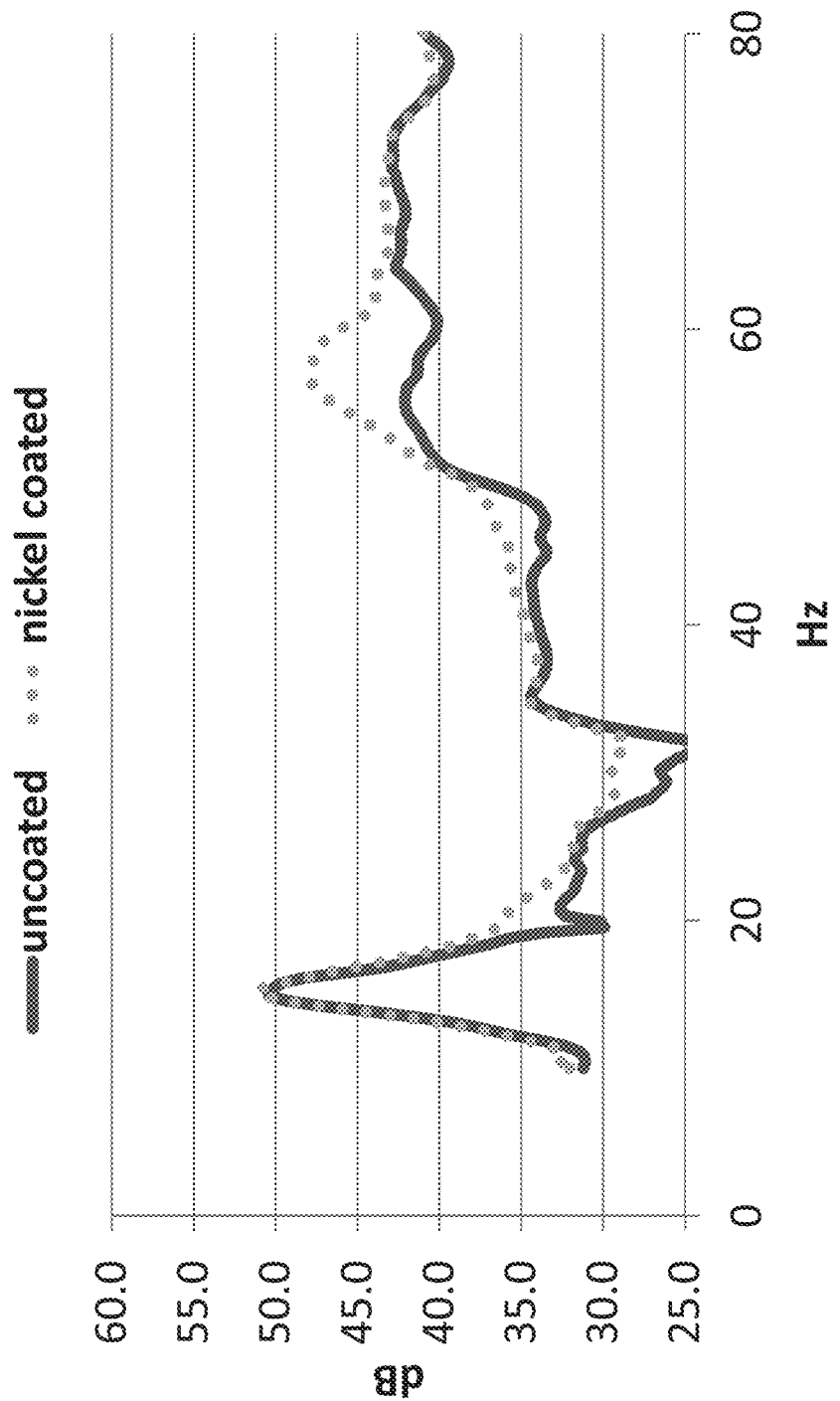
FIG. 6 is a graph entitled "Graph 2-Low power frequency sweep" showing the generally enhanced sensitivity for the nickel-coated rod over a range of low frequencies.
Figure 7:
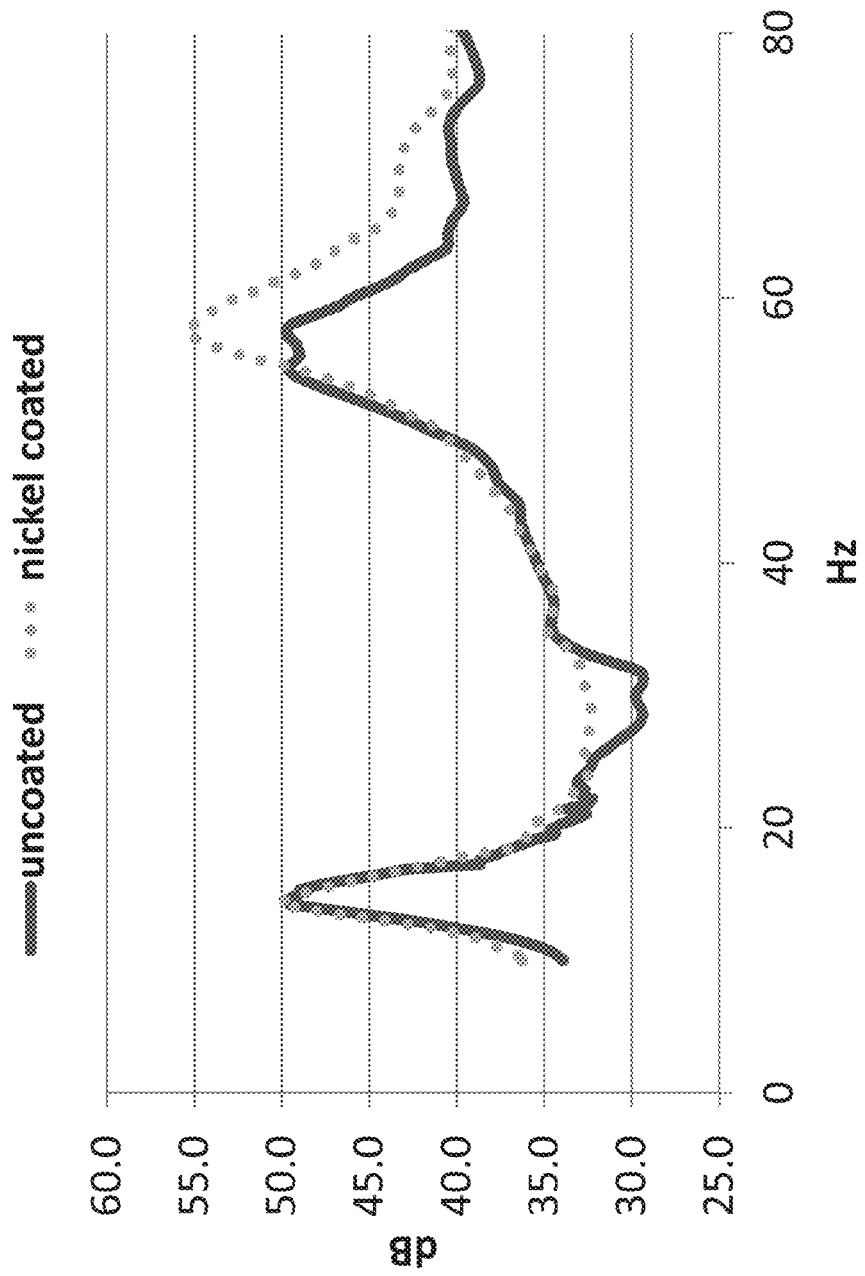
FIG. 7 is a graph entitled "Graph 3-High power frequency sweep" showing the generally enhanced sensitivity for the nickel-coated rod over a range of low frequencies.

The frequency sweep was from 10 Hz to 80 Hz. Within this range, two resonant peaks were observed, one at 15 Hz and one at 55 Hz. The results of the averages of the low power sweep and the high power sweep are shown in FIGS. 6 and 7, respectively. The amplitude of vibration at the proximal end 16 is reported in dB. For each three dB of increase, there is a doubling of the measured energy.

FIG. 6 depicts Graph 2 and shows that at low power, the nickel-coated blanks 28 exhibit a higher power at nearly all frequencies. Of note, the 5 dB difference at both the valley at about 30 Hz and the peak at about 55 Hz is significant. The 5 dB difference represents that about to 150% more energy transferred. The absence of a vibrational resonance for the uncoated blanks 28 at 55 Hz was also a significant observation.

FIG. 7 depicts Graph 3 and shows that as power increases, the pattern of the uncoated blanks 28 starts to look more like that of the nickel-coated blanks 28. In particular, observe the development of the 55 Hz peak in the uncoated samples. But still, the uncoated blank 28 samples exhibit markedly less amplitude at both about 30 and about 55 Hz.

The comparison of Graphs 2 and 3 not only indicates that the nickel-coated fiber blanks 28 transfer considerably more energy to the proximal end 16 of the blank 28, but just as important, nickel-coated fiber blanks 28 initiate that transfer at a lower power rate. To a fisherman using a fishing rod 10 having metal-coated carbon fiber 44 (e.g. nickel-coated carbon fiber), this would result in not only a more sensitive fishing rod 10 (i.e., a fishing rod 10 with enhanced tactile response) in any given waters, but the nickel-coated fishing rods 10 may be sensitive in waters where the uncoated rods are not.

Human subject sensitivity testing. In order to determine what this measurable sensitivity means to a fisherman, a double blind study of the effect of how people feel the fishing rod was conducted. Two populations of ten rods each (one population of nickel-coated fiber fishing rods 10 and another population of plain carbon fiber fishing rods) were separated into two piles and each person was directed to randomly pick one rod from each population. A unique ID of each fishing rod was recorded to maintain the integrity of the test. After a nickel-coated fiber fishing rod 10 and a plain carbon fiber fishing rod were randomly chosen from the populations of each, the person was asked to lightly drag the tip 18 of each fishing rod (as lightly as possible) across a section of commercial carpet, with eyes closed, and report which tip 18 could be felt more or sooner. (This is a fairly common in-store method by which a fisherman buying a rod might judge the sensitivity of the rod.) Sixty blind human hand tests were conducted.

Of the 60 tests, 47 subjects chose the nickel-coated fishing rod 10. In almost every case, the choice was made very quickly, usually after one or two strokes. Of the 13 others, seven were undecided and six chose the plain carbon fiber fishing rod. With the six that chose plain carbon fiber fishing rods, it took those individuals several strokes to decide, none were quick.

Thus, this human study generally establishes that vibrations induced in the tip 18 of a the fishing rod 10 fabricated from the nickel-coated carbon fiber 44 can be detected and measured and felt to a significantly greater magnitude than the uncoated, plain carbon fiber counterparts. This human test assumes that the ability for a person to distinguish vibrations is constant from person to person, which, of course, it is not.

In another human study, the conservation of energy exhibited with the nickel-coated carbon fiber composite fishing rods 10 was to determine if more energy was delivered when casting. Again, in this study fishing rods of substantially identical weight, stiffness, and strength were used. Five fishing rods of each type (plain carbon fiber fishing rods and nickel-coated carbon fiber fishing rods 10) were cast with identical weight-forward line and under identical conditions. The distance for each of twenty casts with each fishing rod, by the same caster, were averaged. The average cast using the nickel-coated carbon fiber fishing rods 10 was 75 feet, while the average cast for the plain carbon fiber fishing rods was 70 feet. Although this test assumes that the caster has ability to make identical casts each time, the averaging over one hundred casts for each type of rod would still suggest that the conservation of energy in the nickel-coated carbon fiber composite fishing rods 10 results in enhanced distance in casting. Further, a similar increased distance may be expected in golf clubs using the nickel-coated carbon fiber composite.

While the examples in data above refer to a fishing rod, this is only exemplary. The technology, resulting in a conservation of energy up or down the composite, may be applied to any composite system that may employs nickel-coated carbon fiber. As a result, portions of recreational equipment, such as fishing rods, golf clubs, ski poles, hiking poles, and the like, may enjoy enhanced performance. Those skilled in the art will appreciate that the present exemplary embodiments are not intended to be limiting, but are exemplary of other embodiments and may suggest to those skilled in the art embodiments not specifically described herein.

The present exemplary embodiments may be embodied in other specific forms without departing from its structures, methods, or other essential characteristics as broadly described herein and claimed hereinafter. The described embodiments are to be considered in all respects only as illustrative, and not restrictive. The scope of this disclosure is, therefore, indicated by the appended claims, rather than by the foregoing description. All changes that come within the meaning and range of equivalency of the claims are to be embraced within their scope.

The invention claimed is:

1. An elongate, fiber-reinforced polymer composite structure that exhibits enhanced mechanical properties over an elongate, carbon fiber-reinforced polymer composite structure having substantially the same weight, stiffness, and strength, the fiber-reinforced polymer composite structure comprising:

a plurality of metal-coated carbon fibers, each metal-coated carbon fiber of the plurality of metal-coated carbon fibers comprising:
a carbon fiber having an outer surface; and
a metal coating on the carbon fiber, the metal coating having an interior surface and an exterior surface, the metal coating for the carbon fiber being non-carbide forming so that no chemical bonding occurs between the interior surface of the metal coating and the carbon fiber, the interior surface of the metal coating on the carbon fiber and the corresponding outer surface for the carbon fiber form a non-bonding fiber/coating interface; and a polymeric resin matrix into which the plurality of metal-coated carbon fibers are dispersed, the exterior surface of the metal coating for each of the plurality of metal-coated carbon fibers being bound to the polymeric resin matrix to form the fiber-reinforced polymer composite structure, the fiber-reinforced polymer composite structure having an elongate structure, the elongate structure having opposite ends, a proximal end and a distal end, wherein the elongate structure conserves energy transferred from one end to the opposite end such that energy applied to the distal end transfers to the proximal end resulting in a received amount of energy that is greater than the amount of energy received by the elongate, carbon fiber-reinforced polymer composite structure experiencing the same application of energy, and energy applied to the proximal end transfers to the distal end resulting in a received amount of energy that is greater than the amount of energy received by the elongate, carbon fiber-reinforced polymer composite structure experiencing the same application of energy, the difference between the received amount of energy transferred via the elongate structure and the amount of energy received by the carbon fiber-reinforced polymer composite structure represents an increase of energy transferred.

2. The fiber-reinforced polymer composite structure as in claim 1 wherein the increase of energy transferred ranges between an increase of 25% to 100% over the amount of energy received by the carbon fiber-reinforced polymer composite structure experiencing the same application of energy.

3. The fiber-reinforced polymer composite structure as in claim 1 wherein the metal coating comprises nickel.

4. The fiber-reinforced polymer composite structure as in claim 3 wherein the nickel comprises between 15% and 30% by weight of the metal-coated carbon fibers.

5. The fiber-reinforced polymer composite structure as in claim 3 wherein the nickel comprises about 20% by weight of the metal-coated carbon fibers.

6. The fiber-reinforced polymer composite structure as in claim 1 wherein the elongate structure is a tube.

7. The fiber-reinforced polymer composite structure as in claim 6 wherein the tube is tapered.

8. The fiber-reinforced polymer composite structure as in claim 6 wherein the tube is at least a portion of an item of recreational equipment.

9. The fiber-reinforced polymer composite structure as in claim 8 wherein the item of recreational equipment is a fishing rod.

10. The fiber-reinforced polymer composite structure as in claim 1 further comprising a tint layer disposed over at least a portion of the fiber-reinforced polymer composite structure, the tint layer comprising at least one of an epoxy and urethane, wherein at least a portion of the tint layer is less than three microns thick.

11. A fishing rod that exhibits enhanced mechanical properties over a carbon-fiber fishing rod having substantially the same weight, stiffness, and strength, the fishing rod comprising:

a tapered tubular structure of fiber-reinforced polymer composite, comprising:

a plurality of metal-coated carbon fibers, each metal-coated carbon fiber of the plurality of metal-coated carbon fibers comprising:
a carbon fiber having an outer surface; and
a metal coating on the carbon fiber, the metal coating having an interior surface and an exterior surface, the metal coating for the carbon fiber being non-carbide forming so that no chemical bonding occurs between the interior surface of the metal coating and the carbon fiber, the interior surface of the metal coating on each of the plurality of carbon fibers and the corresponding outer surface for the carbon fiber form a non-bonding fiber/coating interface; and a polymeric resin matrix into which the plurality of metal-coated carbon fibers are dispersed, the exterior surface of the metal coating for each of the plurality of metal-coated carbon fibers being bound to the polymeric resin matrix to form the fiber-reinforced polymer composite, the fiber-reinforced polymer composite being formed into the tapered tubular structure, the tapered tubular structure having opposite ends, a proximal end and a distal end, wherein the tapered tubular structure conserves energy transferred from one end to the opposite end such that energy applied to the distal end transfers to the proximal end resulting in a received amount of energy that is greater than the amount of energy received by the carbon-fiber fishing rod experiencing the same application of energy, and energy applied to the proximal end transfers to the distal end resulting in a received amount of energy that is greater than the amount of energy received by the carbon-fiber fishing rod experiencing the same application of energy, the difference between the received amount of energy transferred via the tapered tubular structure and the amount of energy received by the carbon-fiber fishing rod represents an increase of energy transferred.

12. The fishing rod as in claim 11 wherein the metal coating comprises nickel.

13. The fishing rod as in claim 12 wherein the nickel comprises between 15% and 30% by weight of the metal-coated carbon fibers.

14. The fishing rod as in claim 12 wherein the nickel comprises about 20% by weight of the metal-coated carbon fibers.

15. The fishing rod as in claim 11 further comprising a tint layer disposed over at least a portion of the tapered tubular structure of fiber-reinforced polymer composite, the tint layer comprising at least one of an epoxy and urethane, wherein at least a portion of the tint layer is less than three microns thick.

16. A method for fabricating a fiber-reinforced polymer composite tubular structure that exhibits enhanced mechanical properties over a comparable carbon fiber-reinforced polymer composite elongate structure having substantially the same weight, stiffness, and strength, the method comprising the steps of:

preparing a reduced amount of carbon fibers for coating, the reduced amount of carbon fibers being an amount by weight that offsets the weight of a metal coating to be applied to the carbon fibers so that the fiber-reinforced polymer composite tubular structure being fabricated will have substantially the same weight, stiffness, and strength as the comparable carbon fiber-reinforced polymer composite elongate structure;

coating the reduced amount of carbon fibers with a metal coating on each carbon fiber to form a plurality of metal-coated carbon fibers, the metal coating having an interior surface and an exterior surface, the metal coating for each carbon fiber being non-carbide forming so that no bonding occurs between the metal coating and each carbon fiber;

forming a non-bonding fiber/coating interface between an outer surface of each carbon fiber and the interior surface of the metal coating for each such metal-coated carbon fiber;

adding a polymeric resin to the plurality of metal-coated carbon fibers to form a polymeric resin matrix sheet wherein the exterior surface of the metal coating bonds with the polymeric resin;

rolling the polymeric resin matrix sheet onto a mandrel;

curing the polymeric resin matrix sheet rolled onto the mandrel to form the fiber-reinforced polymer composite tubular structure; and removing the fiber-reinforced polymer composite tubular structure from the mandrel.

17. The method as in claim 16 wherein the metal coating comprises nickel.

18. The method as in claim 17 wherein the nickel comprises between 15% and 30% by weight of the metal-coated carbon fibers.

19. The method as in claim 17 wherein the nickel comprises about 20% by weight of the metal-coated carbon fibers.

20. The method as in claim 16 further comprising the step of applying a tint layer disposed over the fiber-reinforced polymer composite tubular structure, the tint layer comprising at least one of an epoxy and urethane, wherein at least a portion of the tint layer is less than three microns thick.

* * * * *